United States Patent
Zwan et al.

[19]

[11] Patent Number: 6,098,028
[45] Date of Patent: *Aug. 1, 2000

[54] COMMUNICATION LINE TEST APPARATUS WITH AN IMPROVED GRAPHICAL USER INTERFACE

[75] Inventors: Bryan J. Zwan, Clearwater; Kenneth T. Myers, Palm Harbor, both of Fla.

[73] Assignee: Digital Lightwave, Inc., Clearwater, Fla.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/071,634

[22] Filed: May 1, 1998

Related U.S. Application Data

[63] Continuation of application No. 08/619,897, Mar. 19, 1996.
[51] Int. Cl.[7] ................................................ G06F 19/00
[52] U.S. Cl. ..................... 702/120; 702/108; 702/117; 702/118; 702/66; 702/67; 702/68; 714/25; 714/37
[58] Field of Search ..................... 702/108, 90; 370/241, 370/60, 254, 392, 358, 252; 345/173; 341/34, 143; 379/22, 21, 29; 707/501; 375/330

[56] References Cited

U.S. PATENT DOCUMENTS

| | | | |
|---|---|---|---|
| 4,092,491 | 5/1978 | Frazer | 375/283 |
| 4,791,659 | 12/1988 | Ross | 379/22 |
| 4,967,405 | 10/1990 | Upp et al. | 359/135 |
| 4,998,242 | 3/1991 | Upp | 370/392 |
| 5,038,142 | 8/1991 | Flowers et al. | 341/34 |
| 5,175,492 | 12/1992 | Wong et al. | 702/108 |
| 5,305,437 | 4/1994 | Fritze et al. | 345/520 |
| 5,546,517 | 8/1996 | Marks et al. | 707/501 |
| 5,572,515 | 11/1996 | Williamson et al. | 370/252 |
| 5,594,471 | 1/1997 | Deeran et al. | 345/173 |
| 5,619,489 | 4/1997 | Chang et al. | 370/241 |
| 5,724,492 | 3/1998 | Matthews, III et al. | 345/419 |
| 5,808,920 | 3/1996 | Zwan et al. | 702/120 |

*Primary Examiner*—James P. Trammell
*Assistant Examiner*—Cuong H. Nguyen
*Attorney, Agent, or Firm*—Stein, Schifino & Van Der Wall

[57] ABSTRACT

A novel graphical user interface for test device applications which permits simultaneous display of system status and alarm information while supporting graphically based test device I/O and configuration. The present invention also includes a novel graphical representation I/O scheme whereby test device configuration is accomplished through intuitive manipulation of an image of the test device. The present invention also includes embedded menuing features and a "one button down" user input section which facilitates ease of operation of the system. The present invention may be advantageously applied to a test device designed to extract and process telecommunications signals such as DS1, DS3, SONET, and ATM communication protocols.

7 Claims, 7 Drawing Sheets

COMMUNICATION LINE TEST APPARATUS WITH AN IMPROVED GRAPHICAL USER INTERFACE

This is a continuation application of U.S. Ser. No. 08/619,897, filed on Mar. 19, 1996. The entire disclosure of the prior application is considered as being part of the disclosure of the application and is hereby incorporated by reference.

FIELD OF THE INVENTION

This invention relates to a novel graphical user interface. More particularly, the present invention relates to a graphical user interface for communications line test device applications. The invention consists of graphical presentation which permits the display of critical ongoing test parameters while providing for the reconfiguration of test operations. The invention utilizes an intuitive "one button down" approach to signify the active operation and employs a straightforward user touch screen input device. Configuration of the test device is facilitated by presentation of a graphical representation of the physical device. Inputs into the system are then made by touching the desired portion of the graphical representation of the device.

BACKGROUND OF THE INVENTION

The complexity of communications test devices has increased with the complexity of the instruments and systems they are designed to analyze. This additional complexity has rendered ineffective the former dials and buttons of prior test devices. Others have attempted to propose graphical user interfaces for test devices. Generally, Graphical User Interfaces (GUI) are well known in the art and a shift in the computer and related industries from word based interfaces to graphic interfaces has occurred in some applications. For example, U.S. Pat. No. 5,384,911 to Bloomfield discloses a GUI that can be used in conjunction with word based systems. The interface does not however provide for graphical representation a physical device.

At least one prior art testing device incorporates GUI technology and is directed to a method and system for graphically depicting and testing components in a data processing system. U.S. Pat. No. 5,305,437 to Fritze et al. discloses a testing method and system as a part of a personal computer's diagnostic control program. As disclosed, a graphic display is coupled to a polling means that determines the configuration of the processing system being tested. The graphic depiction is displayed in response to a determination of the configuration of the processing system. A testing program selectively tests a particular hardware component to determine if the component is defective. In response to identifying a defective component, a graphic display control alters the graphic presentation of the defective component displayed on the screen to alert the technician of the defect. Although the Fritze et al. disclosure provides a testing and interface system adapted for use with personal computers, the disclosed method and system has several significant limitations. For example, the disclosed Fritze et al. method and system does not provide for a menu driven interface that is directly responsive to program commands and pertinent data entry. The disclosed Fritze et al. method and system merely provides a convenient way to display the results of a test operation. Moreover, the disclosure of the Fritze et al. patent does not teach or suggest a method and system that permits the display of simultaneous alarm and status information or the configuration of a test device.

Others have attempted to produce a fully integrated test device for the multitude of communications signal protocols in use today but have routinely utilized inadequate user interfaces. An early attempt to produce a unitary communications line tested was proposed by Harris et al. in U.S. Pat. No. 3,956,601. Harris discloses an early transmission line test device which includes a transmitter section to generate test signals, a receive section to capture test signals, and a display to report data. The Harris test device tests for various parameter conditions including envelope delay, noise, and distortion but each test modality takes place sequentially, with a selection mechanism to advance the instrument from one test to the next. A significant limitation of this disclosure is that the interface used is complex and cumbersome, significantly impeding the utility of the device.

A further attempt was proposed by Szymborski et al. in U.S. Pat. No. 5,121,342. Szymborski discloses a multi-mode test device which evaluates analog and digital telecommunications signals such as T1 and ISDN protocol signals but does not include the capability of processing high speed optical signals. Szymborski utilizes a single programmable gate array to provide an interface for different transmission protocols. The line interface can be reconfigured to accommodate a different line protocol through operator input. However, the Szymborski system is limited to processing one signal at a time with its gate array devoted to one particular protocol of interest. As a result, the user interface of Szymborski does not include the capability to display multiple line protocols simultaneously.

The difficulties and limitations suggested in the preceding are not intended to be exhaustive but rather among the many which may tend to reduce the effectiveness and user satisfaction with prior communications line test devices and methods and the like. Other noteworthy problems may also exist; however, those presented above should be sufficient to demonstrate that prior communications line test devices and methods appearing in the past will admit to worthwhile improvement.

SUMMARY OF THE INVENTION

A novel graphical user interface for test device applications which permits simultaneous display of system status and alarm information while supporting graphically based test device I/O and configuration. The present invention also includes a novel graphical representation I/O scheme whereby test device configuration is accomplished through intuitive manipulation of an image of the test device. The present invention also includes embedded menuing features and a "one button down" user input section which facilitates ease of operation of the system. The present invention may be advantageously applied to a test device designed to extract and process telecommunications signals such as DS1, DS3, SONET, and ATM communication protocols.

OBJECTS OF THE INVENTION

It is therefore a general object of the invention to provide a novel graphical user interface for test devices that will obviate or minimize the problems previously described with reference to the prior art.

It is a further object of the invention to provide a novel graphical user interface for test devices that will present ongoing test parameters and alarm information while permitting user input to the test device.

It is a further object of the invention to provide a novel graphical user interface for test devices that will support an intuitive graphical representation input method to configure the test device.

It is a further object of the invention to provide a novel graphical user interface for test devices that utilizes embedded menus.

It is a further object of the invention to provide a novel graphical user interface for test devices that utilizes an intuitive graphical button scheme.

It is a further object of the invention to provide a novel graphical user interface for test devices as applied to a communications signal line test apparatus.

It is another object of the invention to provide a novel graphical user interface for test devices that supports remote operation and data acquisition to facilitate centralized operator control and data procurement.

DETAILED DESCRIPTION OF THE PREFERRED EMBODIMENTS

Figure 1:
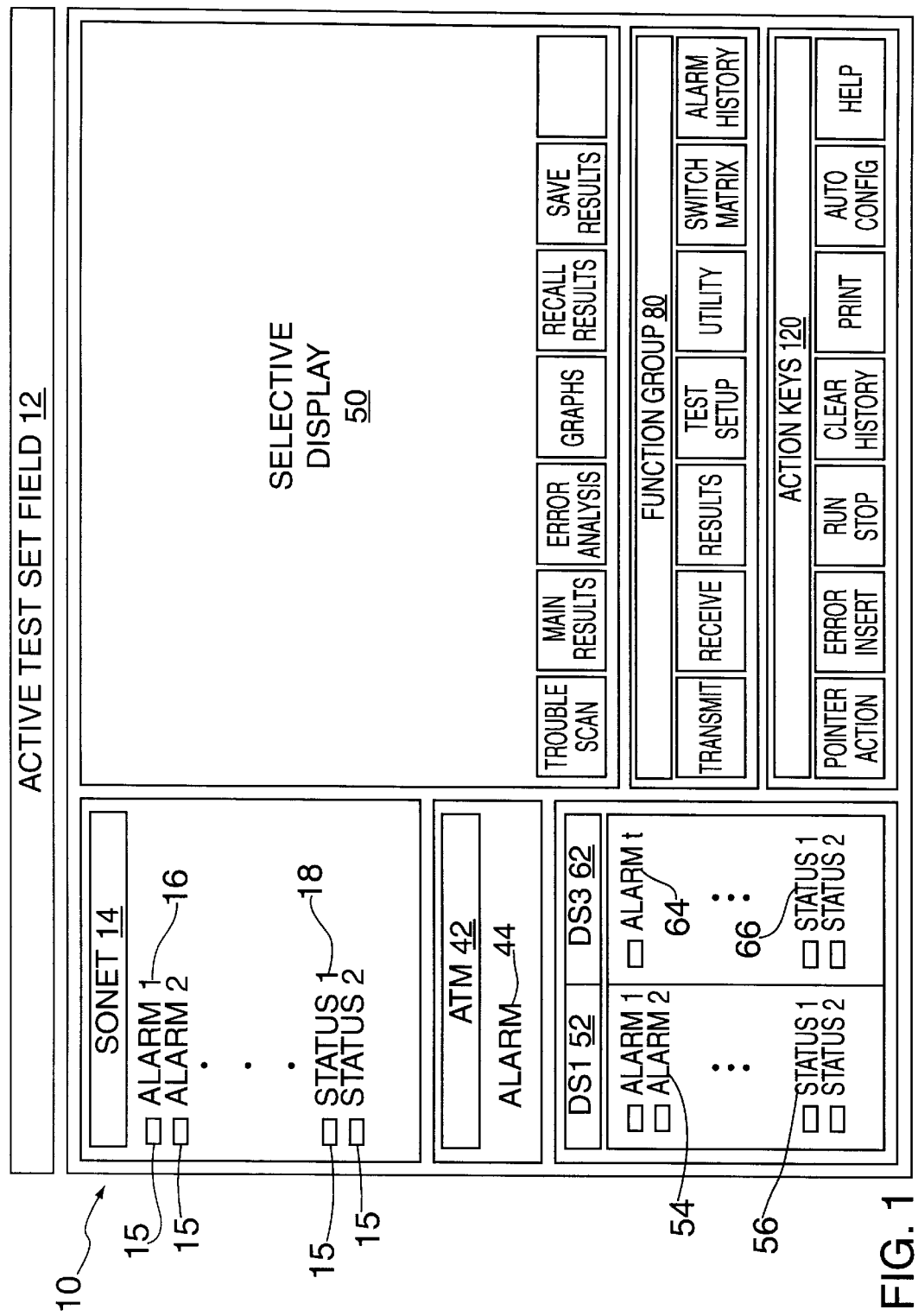
FIG. 1 is a generalized representation of the graphical user interface for test devices of the present invention showing the basic system display.
Figure 2:
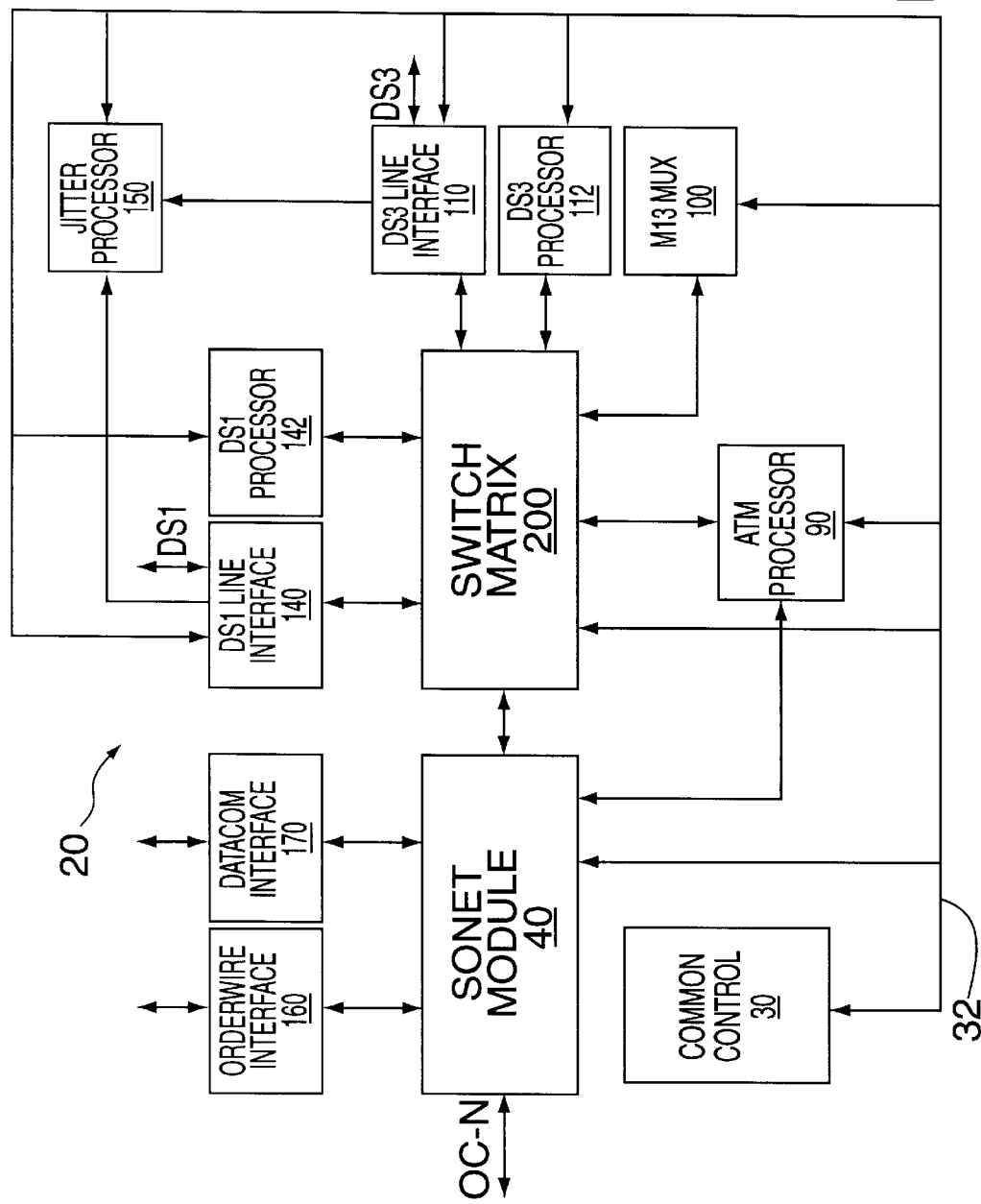
FIG. 2 is a schematic block diagram of a test device utilizing the graphical user interface of the present invention showing the constituent components thereof.

Referring to FIG. 1, the graphical user interface of the present invention is presented in display screen 10. The present invention herein is described as applied to a communications line test device 20; however, it should be appreciated that other applications of the present graphical interface fall within the scope and spirit of the invention. The example test device includes the ability to analyze and process signals in SONET, ATM, DS1 and DS3 protocols. A schematic block diagram of the test device 20 is presented in FIG. 2.

To briefly summarize the components and functions of test device 20, test device 20 consists of several modules including a common control module 30, a SONET module 40, an ATM processor 90, an M13 multiplexer 100, a DS3 line interface 110, a DS3 processor 112, a DS1 line interface 140, a DS1 processor 142, a jitter processor 150, an orderwire interface 160, a datacom interface 170, and a switch matrix 200.

Figure 3:
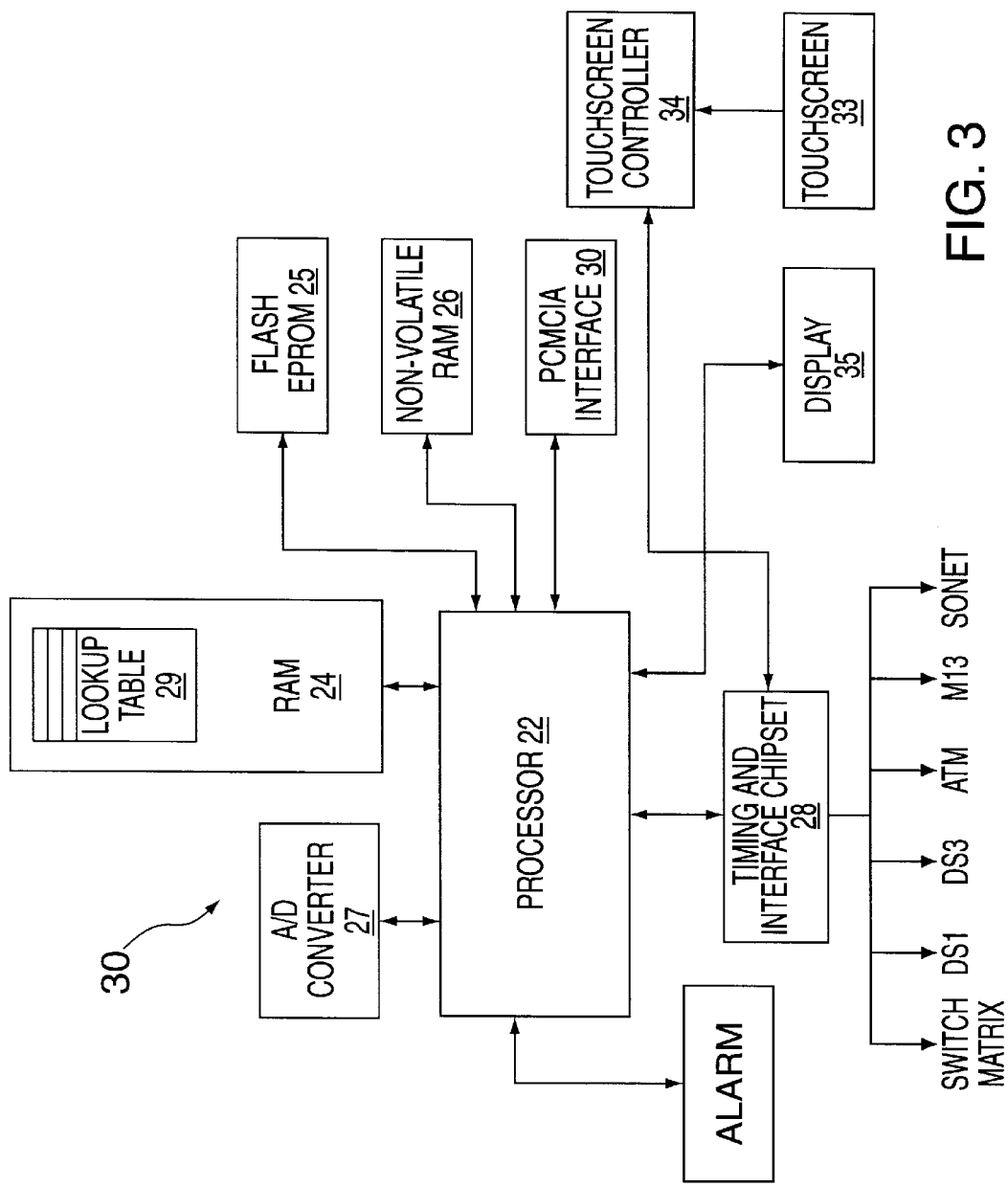
FIG. 3 is a schematic block diagram of a test device utilizing the graphical user interface of the present invention showing the components of the processor and display section thereof.

The display upon which the graphical user interface of the present invention appears can best be appreciated with reference to the FIG. 3 representation of common control module 30. Common control module 30 consists of a high level microprocessor 22, RAM 24, FLASH EEPROM memory 25, non-volatile RAM 26, and associated timing and interface chipset 28. Analog to digital converter 27 permits the control module 30 to measure analog parameters. Control module 30 is further provided with a PCMCIA interface 30 to permit porting of the device using standard PCMCIA type 2 hardware. In this manner, data may be extracted and control information added to the present invention using a stand alone microcomputer. Microprocessor 22 may take the form of any commercially available high level microprocessor but is advantageously comprised of the Intel 80386sl processor for its low power consumption and high speed processing capabilities. Processor 22 communicates with the other components of the present invention over data/address bus 32. Bus 32 is a standard eight bit multiplexed data/address bus commonly used with Intel x86 series microprocessors. Address information is latched to the various devices of the system as desired and programming information and data are enabled over a common bus using time multiplexing in a conventional manner.

RAM 24 consists of commercially available dynamic random access memory with a nominal storage capacity of 10 megabytes. FLASH EEPROM 25 is also conventional in design with a storage capacity of 2 megabytes. Non-volatile RAM 26 consists of approximately 32 KB of any high speed non-volatile RAM such as SRAM with battery backup. Timing and interface chipset 28 includes a timing source, frequency counters, and related clock functions necessary to support the system. Chipset 28 further includes specialized interfaces such as RS-232 and GPIB interfaces to permit remote control of and communication with control module 30.

Control module 30 is also provided with a highly sophisticated display system which consists of touchscreen controller 33, touchscreen 34, and display 35. Display 35 carries the graphical user interface of the present invention and is comprised of a LCD active matrix color display capable of producing hundreds of colors. Overlaying display 35 is a touchscreen 33 which consists of commercially available capacitive touch panel. Touchscreen 33 is controlled by touchscreen controller 34 which senses the position of an input to the system by polling touchscreen 33 and calculating the input position. Input position information is then passed back to microprocessor 22 for further use and processing.

Information is presented on display 35 in distinct zones. Zones are created for the current test performed by the system and for virtual "buttons" used for operator input, shown as boxes 15 in FIG. 1. The operator simply touches the screen in the indicated location to manipulate the system. RAM 24 contains a lookup table 29 corresponding to all possible touch locations on touchscreen 33. At each address in lookup table 29, there is stored a key pointer associated with a particular position on display 35. A user touch adjacent one of the highlighted boxes prompts touchscreen controller 34 to report position data to processor 22 where it is compared to lookup table 29. The pointer derived from lookup table 29 can then take the form of a graphical element to be displayed on display 33 or an executable sequence to reconfigure the underlying test device.

Test device 20 includes the capability of processing signals in DS1, DS3, OC-1, OC-3, OC-12, and ATM formats. It includes a SONET module 40 which includes line interface components to receive such signals and analysis components to process SONET signals and extract lower order component signals. The test device further includes a DS1 line interface 140 to receive DS1 signals, and a DS1 processor 142 to analyze those signals. It further includes a DS3 line interface and DS3 processor to receive and analyze DS3 signals. Still further, test device 20 includes a M13 multiplexer to multiplex and demultiplex DS1 and DS3 signals. Still further, test device 20 includes an ATM module to accept and process ATM signals. All of these functions may be carried out simultaneously using test device 20 through the use of a dynamically configurable switch matrix 200.

Switch matrix 200 allows for a completely non-blocking arrangement of communications pathways between each of the elements of the test device 20. Switch matrix 200 provides switching for data as well as clock signals through the switch fabric and maintains suitable clock and data relationships. Switch 200 cross connects DS1 signals from the M13 mux 100, SONET module 40, ATM Processor 90, DS1 line interface 140 and DS1 processor 142. Similarly, switch 200 cross-connects DS3 signals from M13 mux 100, SONET module 40, ATM processor 90, DS3 line interface 110 and DS3 processor 112. These communications pathways are thus selectable as desired.

Switch 200 allows the following connections in a non-blocking manner for DS1 signals:

| | |
|---|---|
| 1) To SONET Module 40 | From: DS1 Line Interface 140 |
| | DS1 Processor 142 |
| 2) To Mi13 Mux 100 | From: DS1 Line Interface 140 |
| | DS1 Processor 142 |
| 3) To ATM Processor 90 | From: DS1 Line Interface 140 |
| | DS1 Processor 142 |
| 4) To DS1 Line Interface 140 | From: M13 Mux 100 |
| | SONET Module 40 |
| | ATM Processor 90 |
| | DS1 Processor 142 |
| 5) To DS1 Processor 142 | From: M13 Mux 100 |
| | SONET Module 40 |
| | ATM Processor 90 |
| | DS1 Line Interface 140 |

Switch 200 allows the following connections in a non-blocking manner for DS3 signals:

| | |
|---|---|
| 1) To SONET Module 40 | From: DS3 Line Interface 110 |
| | DS3 Processor 112 |
| | M13 Mux 100 |
| | ATM Processor 90 |
| 2) To M13 Mux 100 | From: DS3 Line Interface 110 |
| | SONET Module 40 |
| | ATM Processor 90 |
| 3) To DS3 Interface 110 | From: DS3 Processor 112 |
| | SONET Module 40 |
| | M13 Mux 100 |
| | ATM Processor 90 |
| 4) To DS3 Processor 112 | From: DS3 Line Interface 110 |
| | SONET Module 40 |
| | ATM Processor 90 |
| 5) ATM Processor 90 | From: DS3 Line Interface 110 |
| | DS3 Processor 112 |
| | M13 Mux 100 |
| | SONET Module 40 |

Through the use of the switch 200, the test device supports wholly novel test methods and capabilities. The switch 200 allows an extremely flexible test configuration that enables the user to perform tests or functions not previously available. In prior art devices, a single test is performed on a single line at any given time, even in systems which include more than one test bed. The dynamic routing and switching arrangement enables multiple test protocols to proceed simultaneously. However, the large number of combinations and permutations available for configuration of test device 20 leads to difficulty in operation using prior art techniques. A text based interface would require extensive operator input to designate communications pathways and desired output format. Accordingly, the present graphical interface 10 provides a unique an valuable I/O platform for test device 20.

With reference to FIG. 1, an active test field 12 is presented at the top of graphical interface 10 to immediately apprise the operator of the active test. Because it is contemplated that several of the SONET, ATM, DS3, and DS1 test sets of device 20 may be active at one time, it is important to apprise the user of the currently active test set subject to manipulation and user inputs.

At the left hand portion of interface 10, there are provided several subdivided fields used to continuously report alarm and status information regarding the tests performed by the test device. In the present application, field 14 continuously reports the status and alarm information from the SONET test module. Alarm information 16 and status information 18 are derived from SONET module 40 and is passed to processor 22 for display on graphical interface 10. In like manner, ATM field 42 displays ATM alarm and status information 44 derived from ATM processor 90 and passed to processor 22 for display on graphical interface 10. Still further, alarm information 54 and status information 56 derived from DS1 processor 142 are passed to processor 22 for display on graphical interface 10 in DS1 field 52. Still further, alarm information 64 and status information 66 derived from DS3 processor 112 are passed to processor 22 for display on graphical interface 10 in DS3 field 62.

Selection of any of the SONET, ATM, DS1, or DS3 test sets is accomplished by touching one of the test set fields at the top of each test set section. For example, to manipulate the SONET test set, the user selects the area adjacent the field SONET 14. Similarly, to select ATM operations, the user would select the ATM 42 field.

Function group 80 includes a variety of function keys relevant to test device 20. The application software used for test device 20 assigns these functions as appropriate to suit the test device under consideration. Each location is assigned a particular software function such as Transmit 81, Receive 82, Results 83, Test Setup 84, Utility 85, Switch Matrix 86, Alarm History 87. These functions are common to the various test sets. Selection of a function group key may be accompanied by selection of the menu functions 70. Menu functions 70 provide further choices as to the data or parameters displayed such as Trouble Scan 71, Main Results 72, Error Analysis 73, Graphs 74, Recall Results 75, and Save Results 76. Action keys 120 provide further configurable function keys for graphical interface 10. For this test device, these are assigned as Pointer Action 121, Error Insert 122, Run Stop 123, Clear History 124, Print 125, Auto Config 126, and Help 127. It should be appreciated that the above function keys assignments are by way of a communications line test device example. It is contemplated that the assignment of the function keys of the present invention is supported by conventional application software specific to the application used with test device 20.

Figure 4:
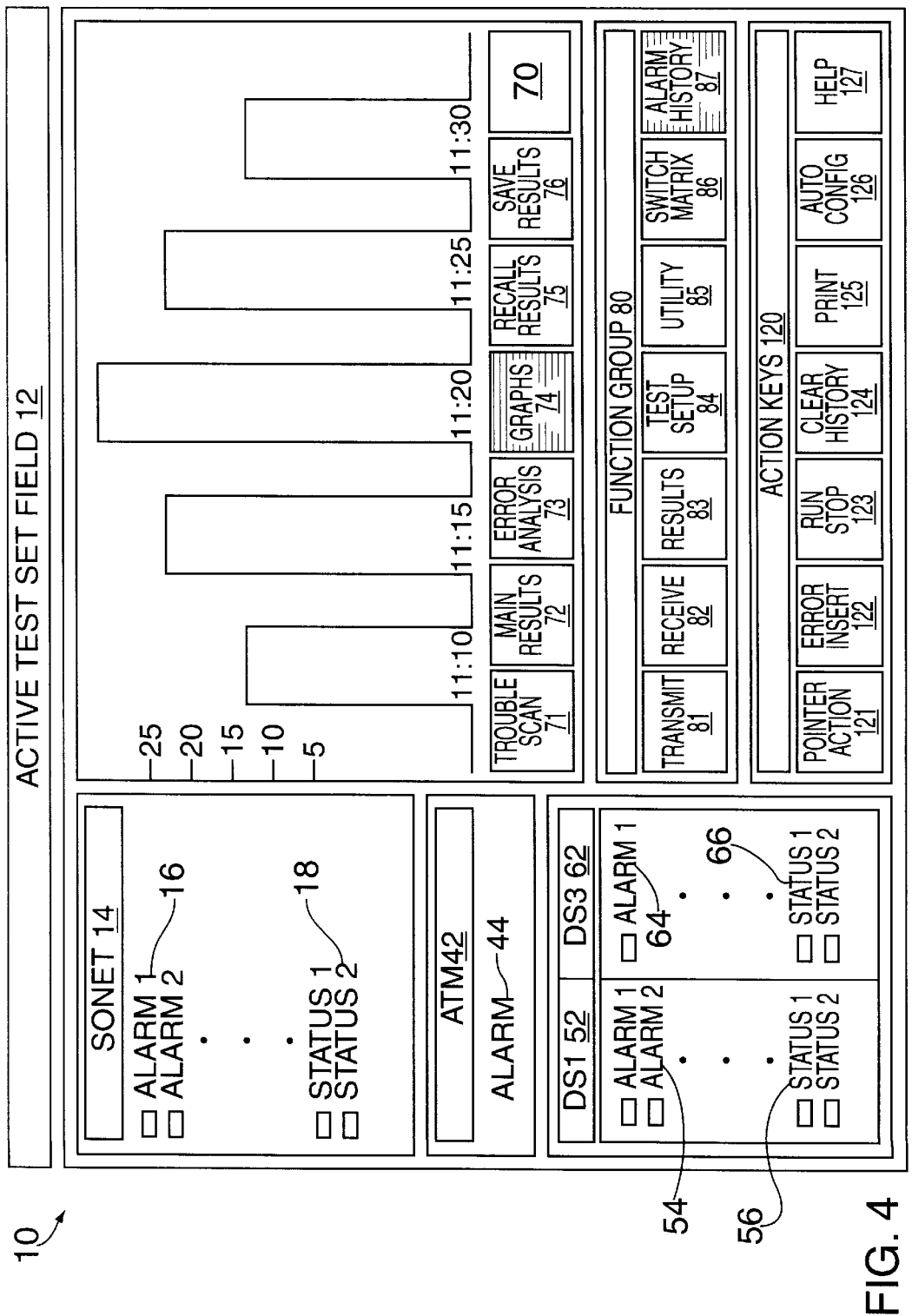
FIG. 4 is a generalized representation of the graphical user interface for test devices of the present invention showing user inputs and a test device display.

Selective display field 50 comprises the largest portion of the overall area of graphical interface 10. Selective display 50 provides the working area for the interface. As an example of the use of such function keys with a communications line test device, in FIG. 4, function key 87 has been selected directing the display of alarm information. Selected function keys are indicated as highlighted on display 35. In addition, menu key 74 is selected to direct the form of the alarm information to be presented. As a result, alarm information in the form of a graphical output appears within selective display field 50. In this manner, multiple layers of configurations may be implemented according to the requirements and capabilities of the underlying test set.

The input function keys of the present invention are adapted to exhibit a "one button down" function within groups. This means that if one button is selected then no others in the group may be selected. If another function is selected then any prior function keys selected within that group are deselected.

An important feature of the present invention is the continued display of important alarm and status messages while other system elements are being manipulated or reviewed. This is accomplished through the use of a partitioned display where SONET field 14, ATM field 42, DS1 field 52, and DS3 field 62 are displayed independently of selectable display 50. The operator can monitor specific alarm or status parameters, configure the system, review historical data or perform other operations without interrupting the continued reporting of critical alarm and status messages.

Figure 5:
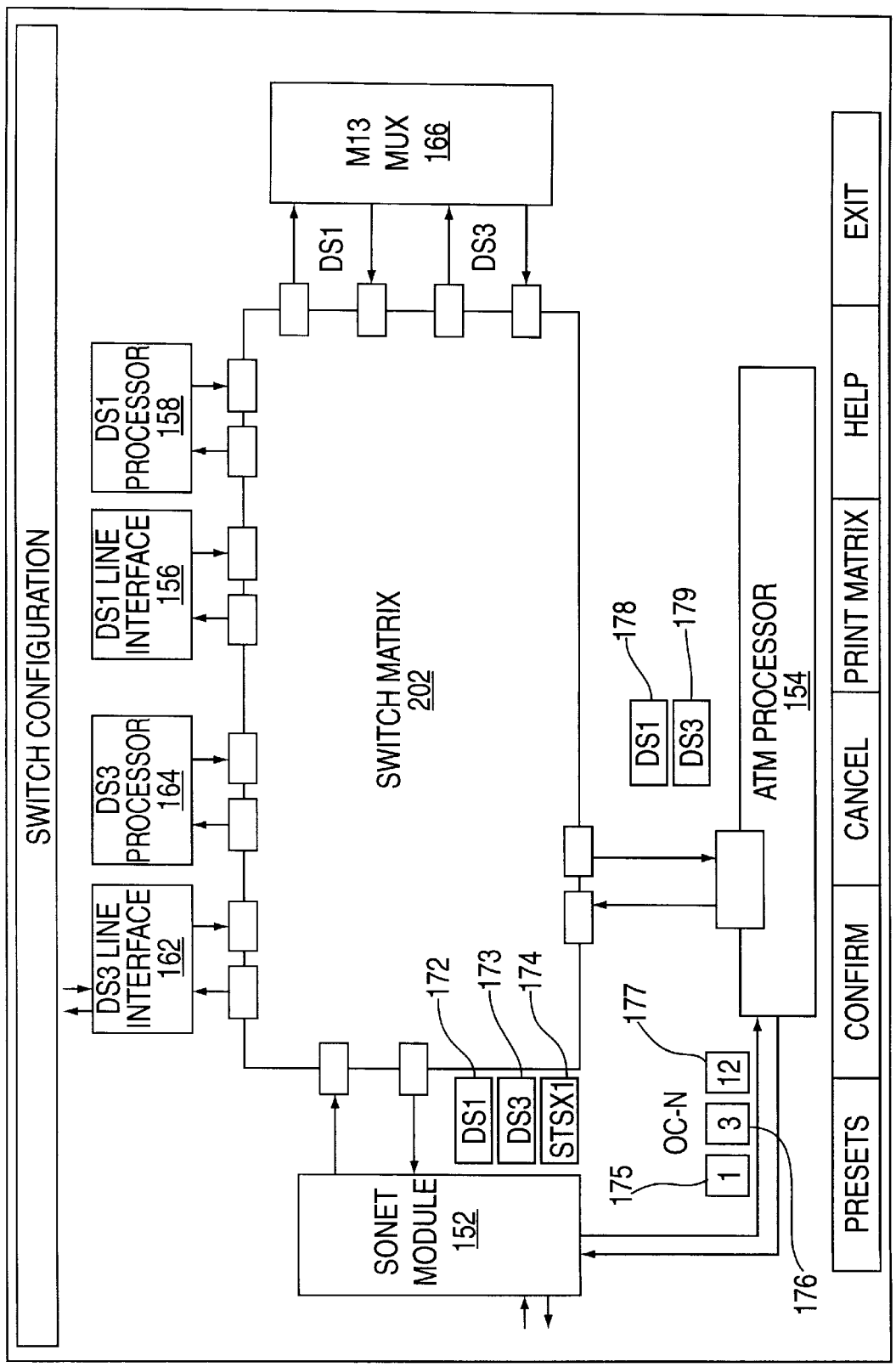
FIG. 5 is a generalized representation of the graphical user interface for test devices of the present invention showing the device configuration display.
Figure 6:
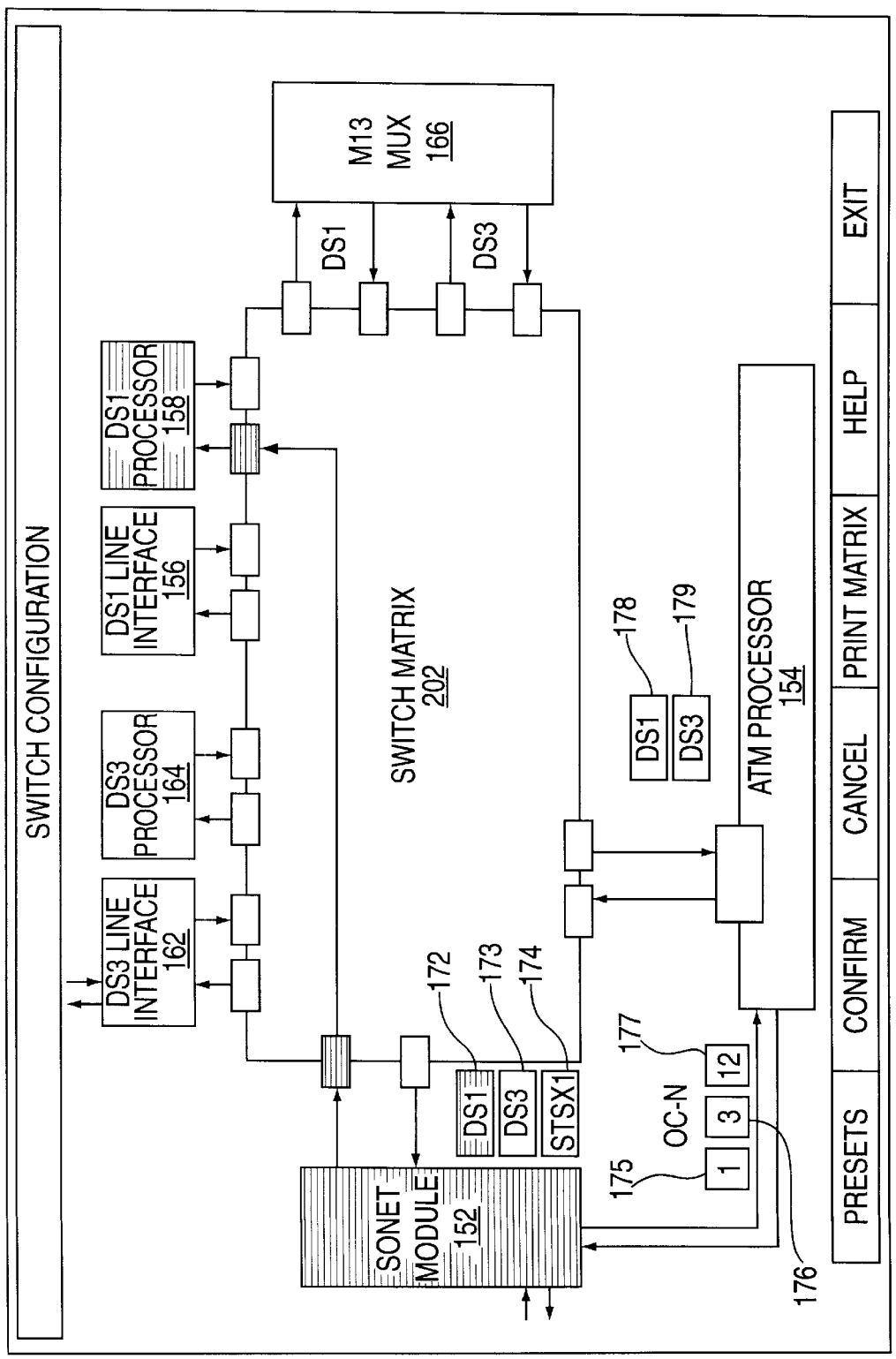
FIG. 6 is a generalized representation of the graphical user interface for test devices of the present invention showing the device configuration display as used to configure the test device.

A further novel aspect of the present invention lies in its use of a graphical representation of test device 20 to create an intuitive configuration platform. As noted previously, the primary elements of the example test device 20 used for this description include a SONET module, an ATM processor, a DS1 line interface, a DS1 processor, a DS3 line interface, a DS3 processor and an M13 mux. Each of these elements surround a switch matrix 200 which creates communications paths between respective elements as desired through operation of processor 22. In order to configure the desired communications paths through switch matrix 200, graphical interface 10 displays a full graphical representation of test device 20 as shown in FIG. 5 including graphical representations of SONET module 152, ATM processor 154, DS1 line interface 156, DS1 processor 158, DS3 line interface 162, DS3 processor 164 and M13 mux 166. Each of the elements described above are shown adjacent a representation of switch 200 shown as graphical representation 202. Additional input pads 172–179 are provided to permit the user to designate the format of the signal to be communicated where appropriate. By selecting elements in sequence, communications pathways are created through switch 200 connecting the respective elements. For example, in FIG. 6 there is presented a version of the graphical interface showing the creation of a communications pathway between the SONET module and the DS1 processor. This connection is produced simply by touching the SONET module representation 152 and the DS1 processor representation 158 in sequence.

Figure 7:
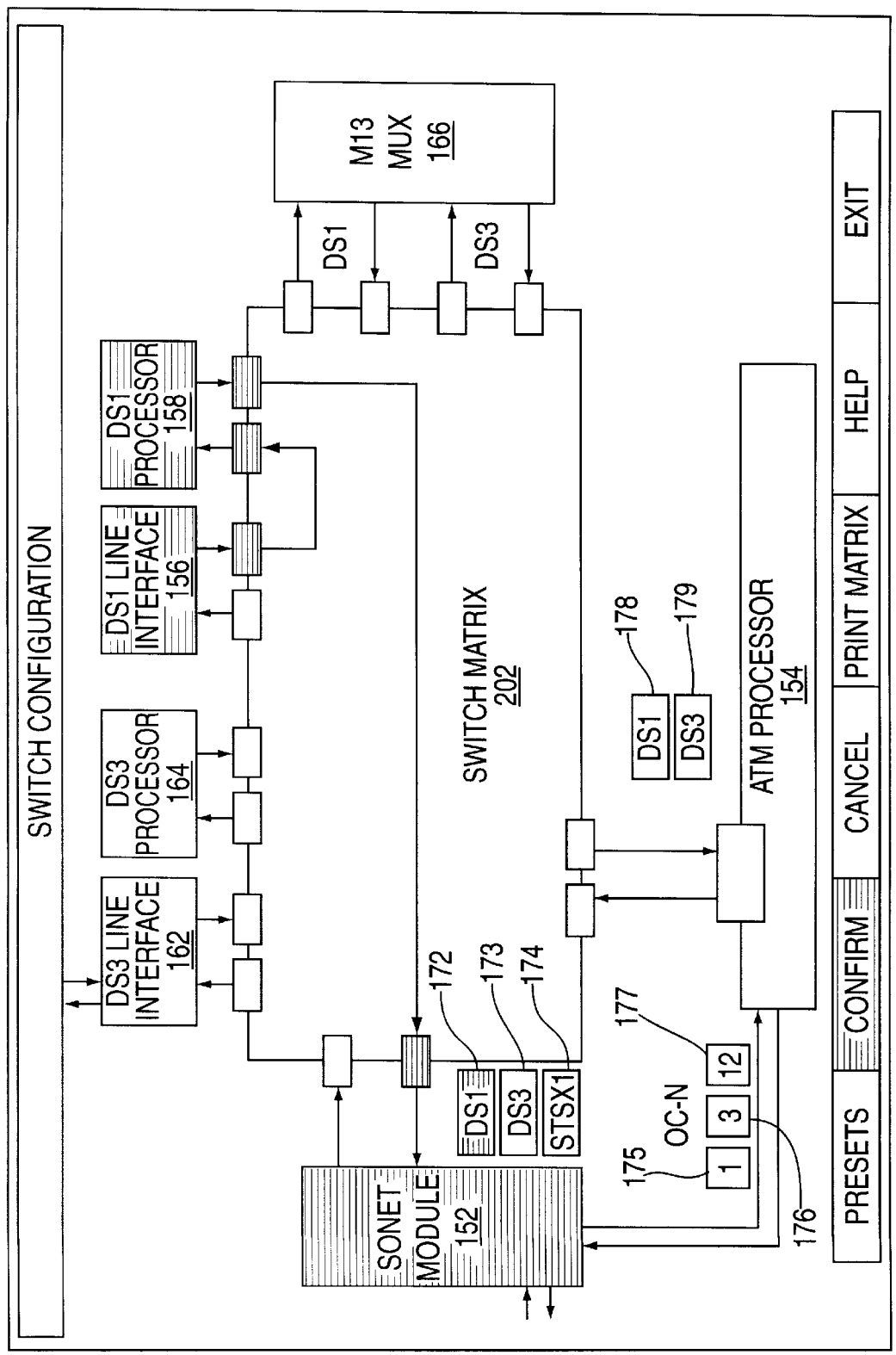
FIG. 7 is a generalized representation of the graphical user interface for test devices of the present invention showing the device configuration display as used to configure the test device to accomplish a specific test.

A further example is set forth in FIG. 7. In FIG. 7, the function of an external network element such as a SONET mux must be analyzed to determine whether its SONET mapping functions are sound. In order to test this function, it is desired to produce a DS1 signal, embed that signal within a SONET OC-12 signal, and have the external SONET mux demap that signal into its constituent signals and return the original DS1 test signal for evaluation by the test device. In order to configure the switch to accomplish this test, the user would first select the DS1 pad 172 to indicate DS1 mapping. The user would then select the output of DS1 processor representation 158 and then the input to SONET module representation 152. The system would then show a dashed connection between element 158 and 152. By selecting "confirm" that connection becomes solid indicating that the system has accepted that configuration. Next, the user would select the input of the DS1 processor 158 and the output of the DS1 line interface 156, press confirm. User then would exit the switch matrix and choose the DS1 test set, and set the desired transmit parameters and form of the results for display on selective display 50. In this manner, a complex test protocol is implemented in a fully intuitive and natural manner. The key to this ease of implementation is the graphical representation of switch matrix 202 and the related system elements. By providing the user with the ability to see and point to desired signal paths, little or no training is required to operate the system. This results in significant savings to those engaged in the operation and maintenance of communications network elements.

It should be appreciated that there has been disclosed in accordance with the present invention, the preferred embodiment of an improved telecommunications test apparatus and method. It is evident that many alternatives, common modifications, and variations would be apparent to one of ordinary skill in the art in light of the description set forth herein. Accordingly, the present invention is intended to embrace all such alternatives, modifications, and variations that fall within the spirit and broad scope of the following appended claims.

We claim:

1. A method of configuring a test device having a plurality of communication test components, said plurality of communication test components including at least a first communication test component and a second communication test component, the method comprising:

displaying a plurality of graphical representations corresponding to said plurality of communication test components of the test device, said plurality of graphical representations including at least a first graphical representation representing said first communication test component and a second graphical representation representing said second communication test component;

receiving a first user input selecting said first graphical representation;

processing said first user input;

receiving a second user input selecting said second graphical representation;

processing said second user input;

establishing a communication path between said first communication test component and said second communication test component; and simultaneously displaying system information for said first and second communication test components.

2. The method of claim 1, further comprising:

receiving a third user input selecting a format of data flowing through said communication path;

processing said third user input;

transmitting data along said communication path in said selected format corresponding to said third user input.

3. The method of claim 1, wherein each of said plurality of graphical representations is selected by pressing a touch screen.

4. The method of claim 1, wherein said plurality of communication test components includes at least two of a DS1 line interface, a DS3 line interface and a SONET module.

5. The method of claim 4, wherein said plurality of communication test components further includes an ATM processor.

6. The method of claim 1, wherein said communication path is configured by a processor connected to a switch matrix.

7. The method of claim 1, further comprising:

displaying a graphical representation of said established communication path.

* * * * *